(12) United States Patent
Opdahl

(10) Patent No.: US 6,305,111 B1
(45) Date of Patent: Oct. 23, 2001

(54) ADVERTISING DISPLAY SYSTEM

(76) Inventor: Everett W. Opdahl, 4407 Long Green Rd., Long Green, MD (US) 21092

(*) Notice: Subject to any disclaimer, the term of this patent is extended or adjusted under 35 U.S.C. 154(b) by 0 days.

(21) Appl. No.: 09/535,579

(22) Filed: Mar. 27, 2000

Related U.S. Application Data

(60) Provisional application No. 60/126,358, filed on Mar. 26, 1999.

(51) Int. Cl.$^7$ ...................................................... G09F 17/00
(52) U.S. Cl. .............................. 40/603; 403/319; 40/590
(58) Field of Search .............................. 40/603, 584, 588, 40/590, 591, 604, 606, 611, 124.05; 403/315, 319, 318

(56) References Cited

U.S. PATENT DOCUMENTS

| | | | |
|---|---|---|---|
| 3,225,407 | * 12/1965 | Daniels | 40/603 |
| 3,805,873 | * 4/1974 | Bloomfield | 40/603 |
| 4,539,734 | * 9/1985 | Messerschmitt | 24/460 |
| 4,547,987 | 10/1985 | Stelling . | |
| 4,580,361 | 4/1986 | Hillstrom et al. . | |
| 4,631,786 | * 12/1986 | Curry | 24/460 |
| 4,756,107 | 7/1988 | Hillstrom . | |
| 4,773,174 | 9/1988 | Boeniger et al. . | |
| 4,800,947 | 1/1989 | Loomis . | |
| 5,039,246 | 8/1991 | Woodruff et al. . | |
| 5,058,299 | 10/1991 | Suzuki . | |
| 5,239,765 | 8/1993 | Opdahl . | |
| 5,373,655 | * 12/1994 | Suzuki | 40/603 |
| 5,896,689 | * 4/1999 | Bassouls et al. | 40/603 |
| 6,088,942 | * 7/2000 | Brooks et al. | 40/603 |
| 6,101,751 | * 8/2000 | Hicks | 40/590 |
| 6,176,634 | * 1/2001 | Yamashita | 403/11 |

* cited by examiner

*Primary Examiner*—Lynne A. Browne
*Assistant Examiner*—Kenn Thompson

(57) ABSTRACT

An advertising display for mounting an advertisement on a supporting structure such as a billboard, the side of truck, or any other substantially planar surface. The advertising display includes an elastic display panel with four edges reinforced by elongate stays. A plurality of upper attachment fittings are spaced lengthwise along the top of the supporting structure. A corresponding plurality of lower attachment fittings are spaced lengthwise along the bottom of the supporting structure. Opposing forward and rear attachment fittings are spaced vertically along the supporting structure. A plurality of retaining clips are also provided each for attachment to the outer lips of the lower attachment fitting as well as the forward and rear attachment fittings for the purpose of retaining the edges of the stays therein, thereby holding the stays captive. The display panel can be tautly suspended over the surface of the supporting structure between the four attachment fittings. This approach to securing the display panel to the surface is to use integral attachment fittings and retainers that can be permanently mounted on the surface, and the need for removal and reinstallation every time a new advertisement is displayed is eliminated. The advertising display system is economical, reliable and can be easily installed by one individual.

8 Claims, 9 Drawing Sheets

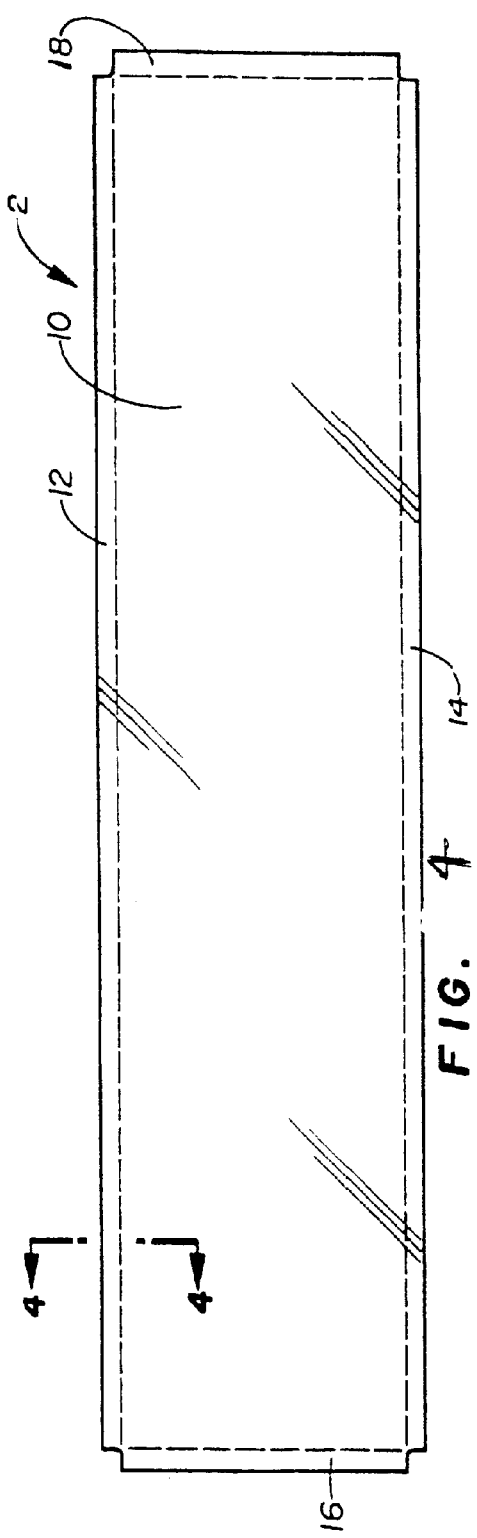
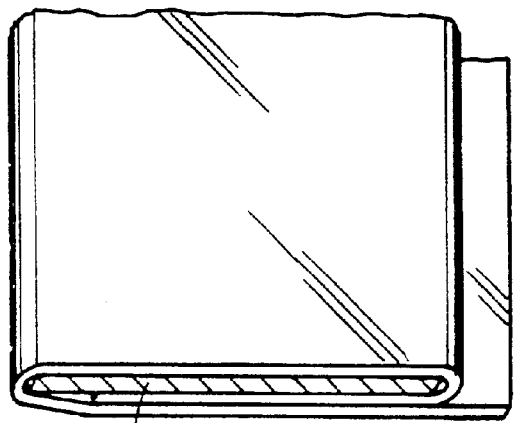
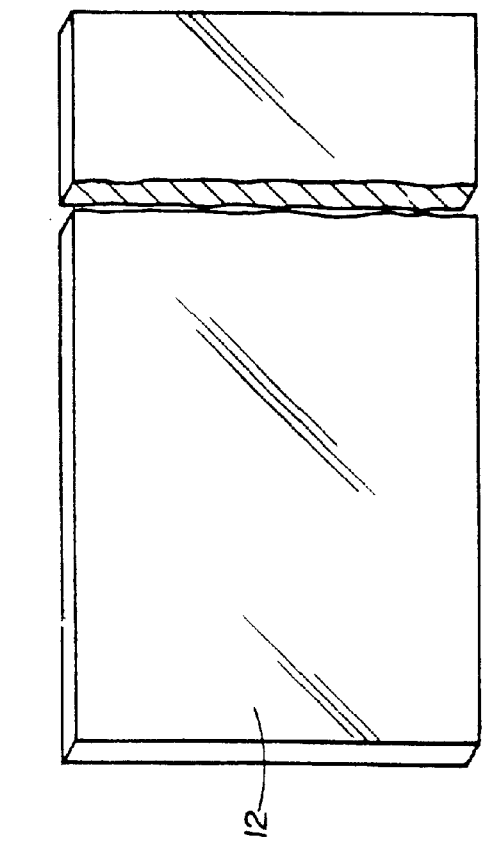

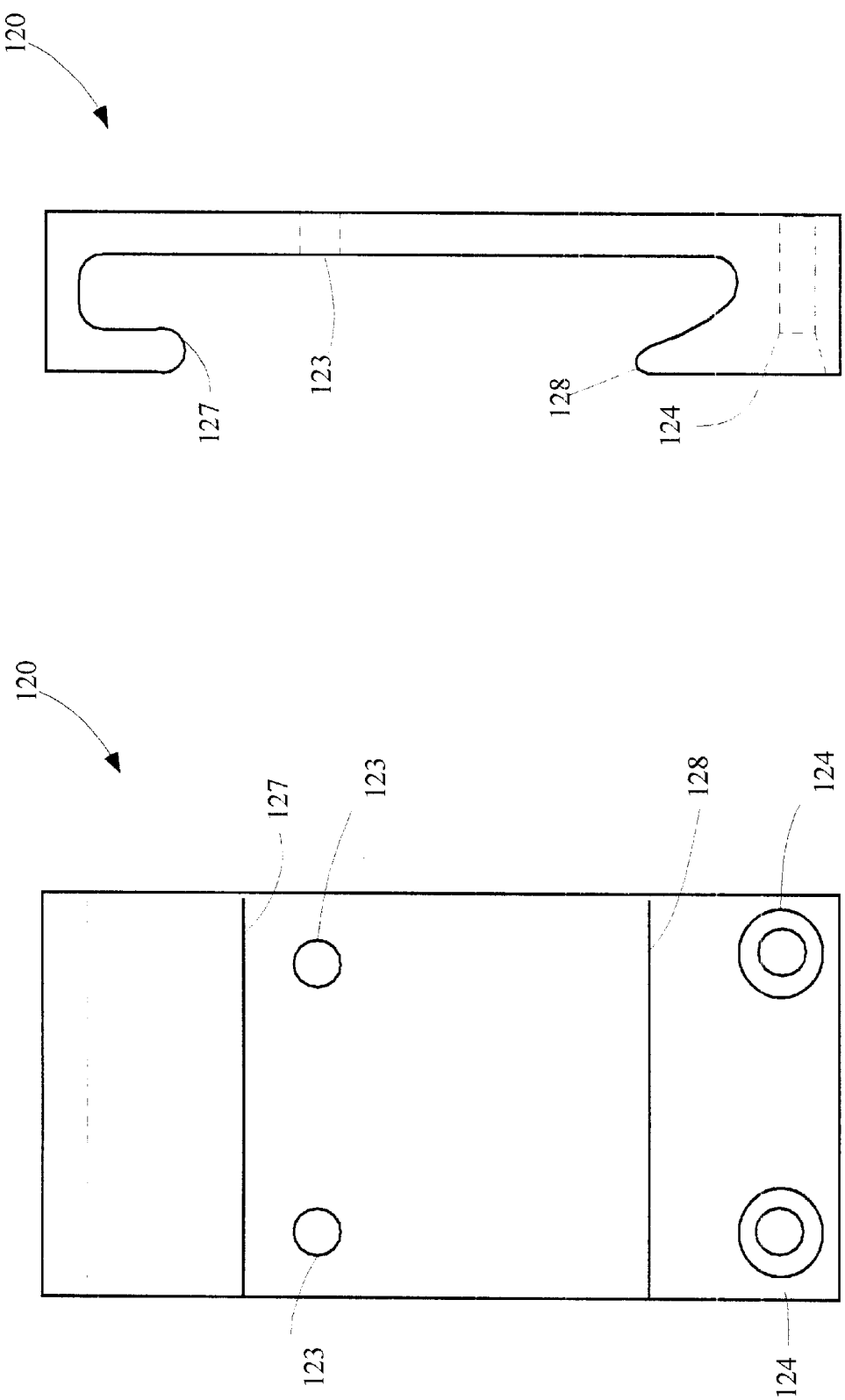

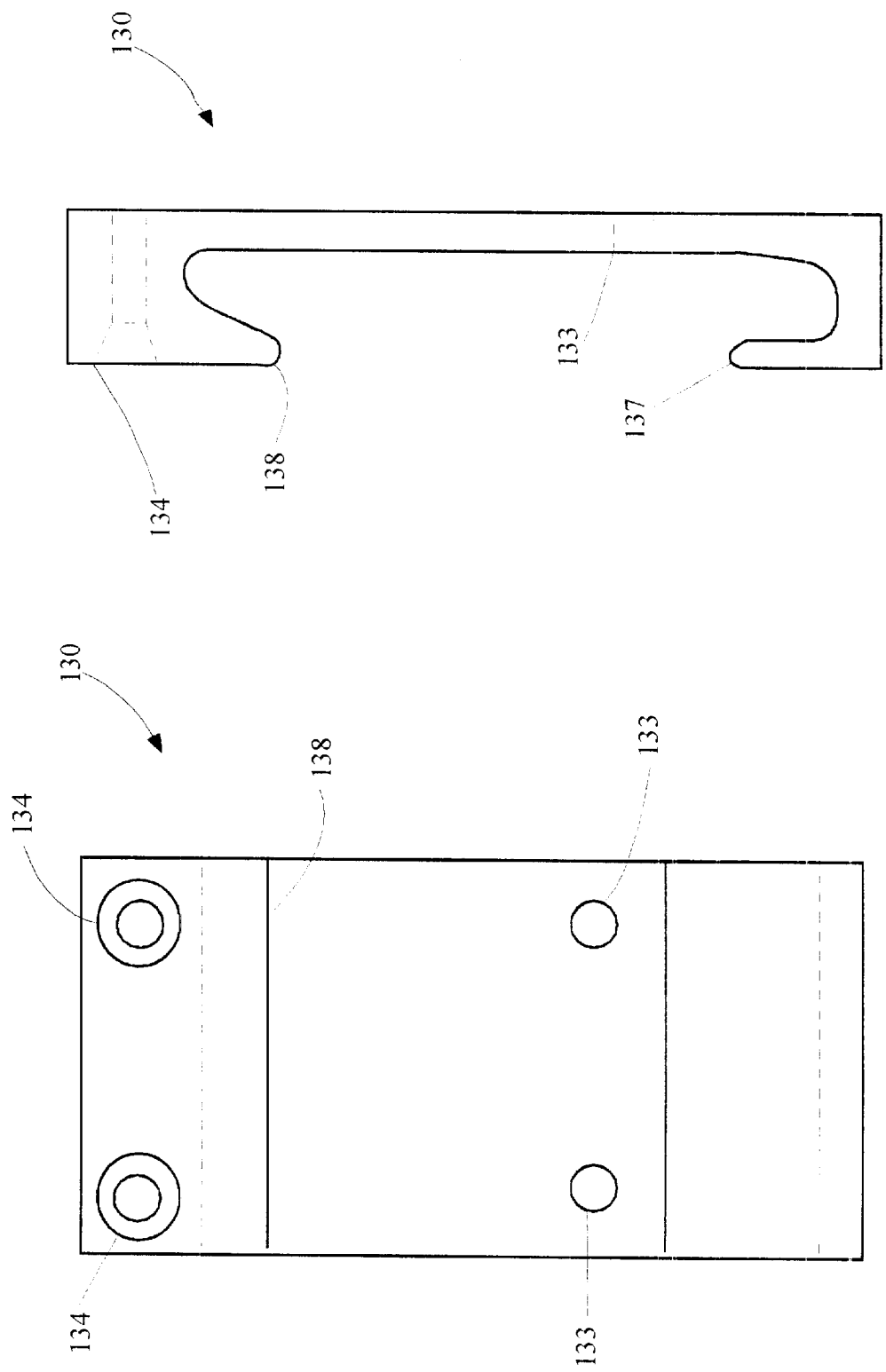

ADVERTISING DISPLAY SYSTEM

CROSS-REFERENCE TO RELATED APPLICATIONS

The present application is based on U.S. Provisional Application No. 60/126,358 for "ADVERTISING DISPLAY SYSTEM"; Filed: Mar. 26, 1999 by Everett Opdahl.

BACKGROUND OF THE INVENTION

1. Field of the Invention

The present invention relates to advertising displays and, more particularly, to a self-tensioning display panel and mounting system for exhibiting advertisements on trucks, billboards and the like.

2. Description of the Background

There is a great demand for advertising displays for use on the sides of trucks, tractor trailers, and for other generally flat surfaces. However, in this type of application the display must be able to withstand high speeds, and the display must provide for convenient interchangeability of the ads themselves. A number of improved displays have been proposed which are more resistant to wind and weather. For example, U.S. Pat. No. 4,580,361 illustrates a display tensioning frame for tautly retaining a large display panel. In addition, U.S. Pat. No. 5,239,765 to the above-named inventor disclosed a low-profile, light-weight advertising display for exhibiting advertisements on trucks, billboards and the like. The advertising display shown in the '765 patent is provided with a self-tensioned display panel which resists sagging and wrinkling by virtue of its own elasticity, and a display panel mounting which allows for more convenient installation and removal. The installation approach described in the '765 patent is to first mount a series of inner retainers 22 (see FIG. 1 herein) around the periphery of the mounting surface. The inner edges of the panel edge stiffeners are then inserted into the inner retainers 22 and secured with a series of outside retainers 20, 30. This procedure is illustrated in the '765 patent. However, due to the size and flexibility of the panel as well as the force required to tension the panel, it is not an easy task to install the outer retainers 20, 30. Also, each time the panel is removed it is necessary to remove all the outer retainers 20, 30. This is a time consuming process, and each step in the process cannot be performed by one individual without great difficulty.

It would be greatly advantageous to reduce the installation time and effort by providing an improved approach to securing the panel to the surface which eliminates the need to remove and install retainers every time a new advertisement is displayed. The new approach would make it feasible for one individual to perform each step in the operation.

SUMMARY OF THE INVENTION

It is, therefore, an object of the present invention to provide an improvement to the invention shown in U.S. Pat. No. 5,239,765 to the inventor herein, the improvement being a new approach to securing the panel to the surface by which one-piece retainers (which consolidate the prior inner and outer retainers) can be permanently mounted on the surface, thereby eliminating the need to remove and install retainers every time a new advertisement is displayed.

According to the present invention, the above-described and other objects are accomplished by providing an advertising display for mounting an advertisement on a supporting structure. The advertising display includes an elastic display panel with at least two opposing edges reinforced by elongate stays. In addition, a plurality of upper attachment fittings are spaced lengthwise along the top of the supporting structure. Each upper attachment fitting comprises an inwardly-disposed upper lip to provide a pivotal seating for one edge of the upper stay, and an inwardly-disposed lower lip to provide a catch for the other edge of the upper stay. A corresponding plurality of lower attachment fittings are spaced lengthwise along the bottom of the supporting structure. Each of the lower attachment fittings comprises an inwardly-disposed upper lip to pivotally seat an edge of the lower stay, and an inwardly-disposed lower lip. A plurality of retaining clips are also provided each for attachment to the lower lip of a corresponding lower attachment fitting for the purpose of retaining the other edge of the lower stay, thereby holding the lower stay captive. The display panel can be tautly suspended over the surface of the supporting structure between the upper and lower attachment fittings. The supporting structure may be a billboard, the side of truck, or any other substantially planar surface. In any case, this approach to securing the display panel to the surface using one-piece attachment fittings and retainers (which consolidate the inner and outer retainers of the prior art) can be permanently mounted on the surface, thereby eliminating the need for removal and reinstallation every time a new advertisement is displayed.

BRIEF DESCRIPTION OF THE DRAWINGS

FIG. 4 is a detailed assembly diagram of the display panel 10 of FIG. 3.

FIG. 5 is a cross-sectional view of stay 12 which is representative of stays 14, 16 and 18.

FIG. 6 is a cross-section of the stay 12 of FIG. 5.

FIGS. 7 and 8 illustrate a front view and side view, respectively, of an upper attachment fitting 120.

FIGS. 9 and 10 illustrate a front view and side view, respectively, of a lower attachment fitting 130.

Other objects, features, and advantages of the present invention will become more apparent from the following detailed description of the preferred embodiment and certain modifications thereof when taken together with the accompanying drawings.

DETAILED DESCRIPTION OF THE PREFERRED EMBODIMENTS

Figure 1:
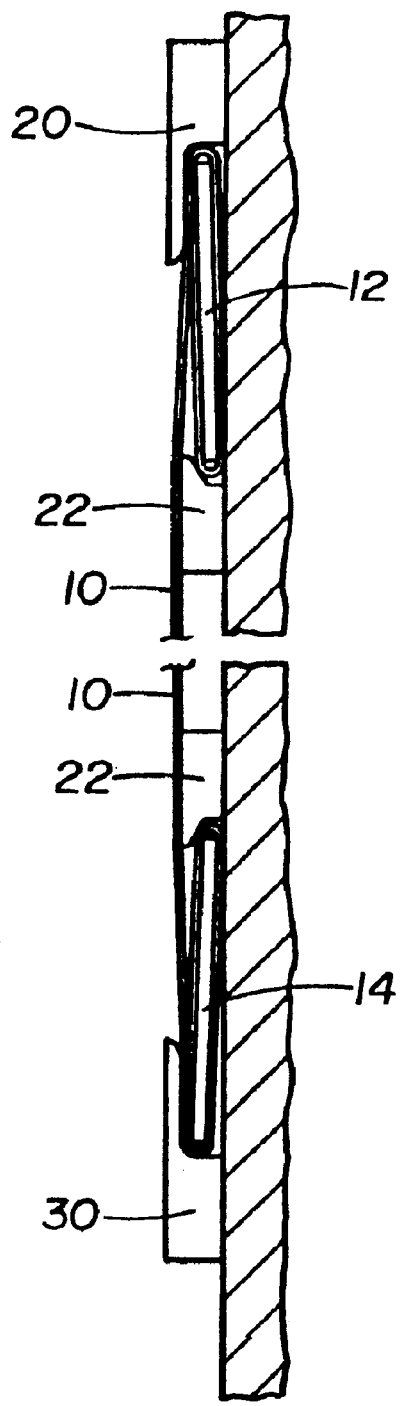
FIG. 1 is a side view from U.S. Pat. No. 5,239,765 illustrating the prior art approach which entails mounting a series of inner and outer retainers 22, 20 around the periphery of the mounting surface.
Figure 2:
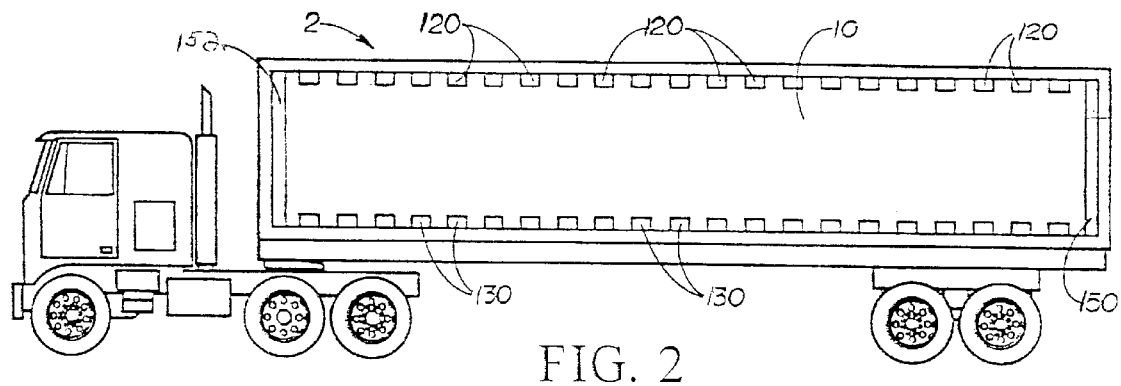
FIG. 2 illustrates a side view of an advertising display 52 according to the present invention which has been installed on the side of a tractor trailer.

FIG. 2 illustrates a side view of an advertising display 52 according to the present invention which has been installed on the side of a tractor trailer.

Advertising display 52 further comprises display panel 10 identical to that shown in U.S. Pat. No. 5,239,765 to the inventor herein (like parts shall be referenced with like reference numerals). The display panel is suspended by a plurality of upper attachment fittings 120, a plurality of lower attachment fittings 130, a forward edge attachment fitting 40, and an aft edge attachment fitting 50.

The advertising display 52 may be alternately sized and mounted on any generally flat surface including a variety of trucks, billboards, buildings and the like. For instance, the side-walls of trucks may be corrugated, or may be provided with exterior reinforcing ribs. The advertising display of the present invention can be mounted on these and other surfaces because the display panel 10 is tautly suspended above the surface.

Figure 3:
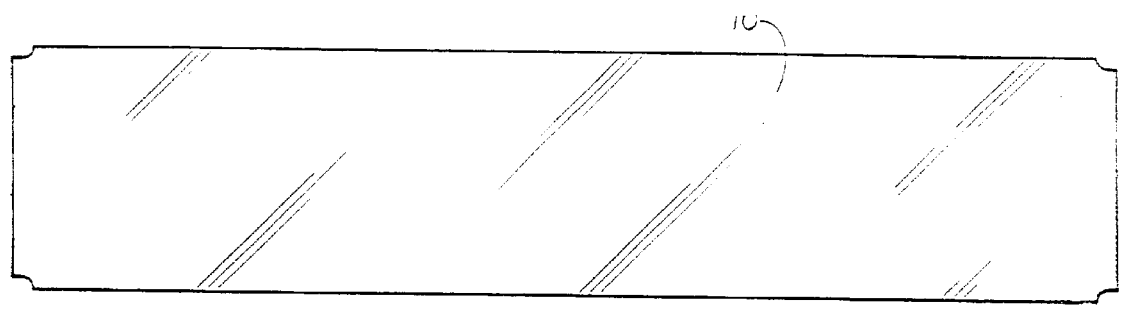
FIG. 3 illustrates the pattern of material for display panel 10 sized in relative proportions to fit the tractor trailer of FIG. 2.

FIG. 3 illustrates the pattern of material for display panel 10 sized in relative proportions to fit the tractor trailer of FIG. 2 (and identical to that shown in U.S. Pat. No. 5,239,765).

FIG. 4 is a detailed assembly diagram of the display panel 10 of FIG. 3. Display panel 10 comprises an elongate top stay 12, an elongate bottom stay 14, forward stay 16 and rear stay 18, all secured to the margins of the material.

FIG. 5 is a cross-sectional view of stay 12 which is representative of stays 14, 16 and 18. The stays 12, 14, 16 and 18 are preferably formed of aluminum, fiberglass, wood or other lightweight and sturdy material. Each stay 12, 14, 16 and 18 spans an entire side of display panel 10, the four stays allowing creation of a framework for supporting the display panel material.

FIG. 6 is a cross-section of the stay 12 of FIG. 5, illustrating the manner in which all of stays 12, 14 16 and 18 are attached lengthwise along the margins of the display panel material, and are enveloped therein for additional durability. The material is secured to stay 12 by adhesive, strips of hook-and-loop fastener, stitching, or other suitable means.

FIGS. 7 and 8 illustrate a front view and side view, respectively, of an upper attachment fitting 120. A plurality of upper attachment fittings 120 are provided along the top of the display area. The upper attachment fittings 120 are equidistantly spaced, and are permanently fastened in one parallel row along the top of the display surface by means of conventional metal screws or rivets (not shown) threaded through upper bore holes 123 and lower tapered bore holes 124. Each upper attachment fitting 120 is provided with a lower lip 128 running lengthwise along the lower margin and hooked inward to provide a pivotal seating for the lower edge of stay 12. Likewise, each upper attachment fitting 120 is provided with an upper lip 127 running lengthwise along the upper margin and hooked inward to provide a catch for the upper edge of stay 12. The distance between the inwardly disposed tips of the lower lip 128 and upper lip 127 is dimensioned to generally correspond to the extent of the stay 12.

FIGS. 9 and 10 illustrate a front view and side view, respectively, of a lower attachment fitting 130. A plurality of lower attachment fittings 130 are provided along the bottom of the display area. The lower attachment fittings 130 are equidistantly spaced, and are permanently fastened in one parallel row along the bottom of the display surface by means of conventional metal screws or rivets (not shown) threaded through upper tapered bore holes 134 and lower tapered bore holes 133. Each lower attachment fitting 130 is provided with an upper lip 138 running lengthwise along the upper margin and hooked inward to provide a pivotal seating for the upper edge of stay 14. Likewise, each lower attachment fitting 130 is provided with a lower lip 137 running lengthwise along the lower margin and hooked inward to provide a catch for the lower edge of stay 14. The distance between the inwardly disposed tips of the lower lip 137 and upper lip 138 is dimensioned to generally correspond to the extent of the stay 14.

In addition, and referring back to FIG. 2, forward and rear attachment fittings 152, 150 are provided along the left and right sides of the display surface. The forward and rear attachment fittings 152, 150 are constructed with the very same cross-section as the lower attachment fittings 130 of FIGS. 9 and 10, but are elongated to extend the entire height of the display panel 10. Alternatively, a plurality of shorter forward or rear attachment fittings may be intermittently spaced along the front and rear of the display surface, and in this case the forward and rear attachment fittings can be identically formed in accordance with the lower attachment fittings 130 of FIGS. 9 and 10. However, on vehicles it is preferred that the forward attachment fitting 152 be elongated to extend the entire height of the display panel 10 as shown in FIG. 2. A full-length forward attachment fitting 152 helps to prevent wind from entering under the display panel 10 and causing rippling.

The forward and rear attachment fittings 152, 150, as well as the lower attachment fitting 130 make use of a plurality of outside retainers 140 to retain the respective stays 12, 14 once seated in the attachment fittings 130, 150 and 152.

Figure 12:
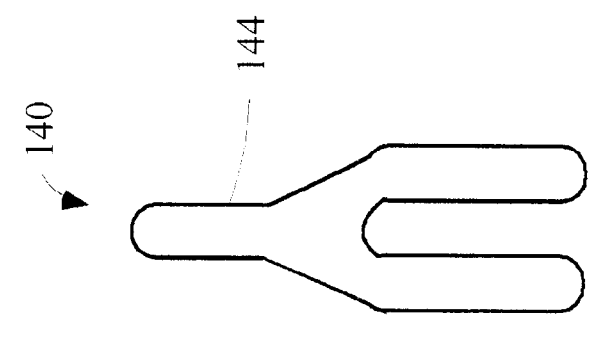
FIGS. 11 and 12 are a front view and side view, respectively, of an exemplary outside retainer 140.
Figure 11:
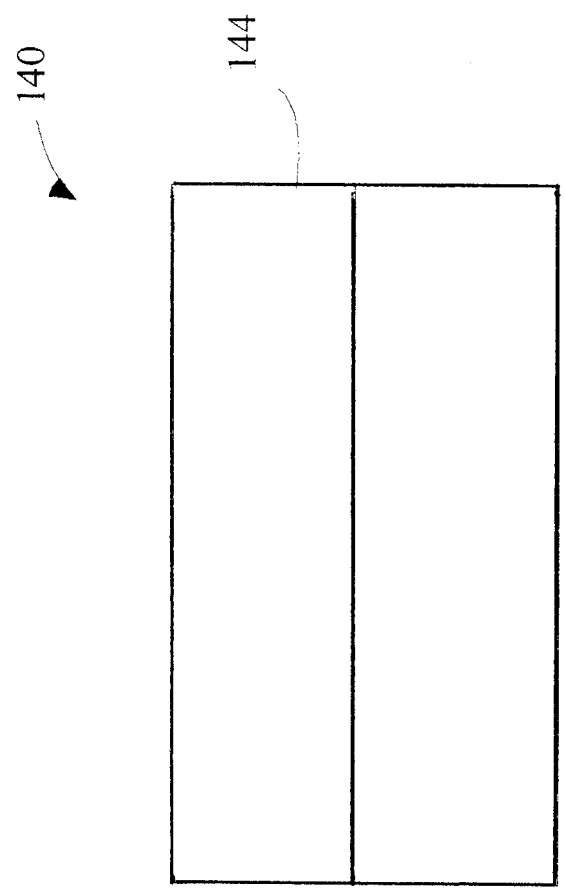

FIGS. 11 and 12 are a front view and side view, respectively, of an exemplary outside retainer 140. A plurality of outside retainers 140 are provided each being an extruded clip with a two-pronged cross-section. The clip of outside retainers 140 are formed for a friction fit over the upper lips 138 of each lower attachment fitting 130. A retaining member 144 protrudes rearwardly from the prongs of the clip.

FIGS. 13–19 sequentially illustrate a preferred method for mounting the display assembly 52.

Figure 15:
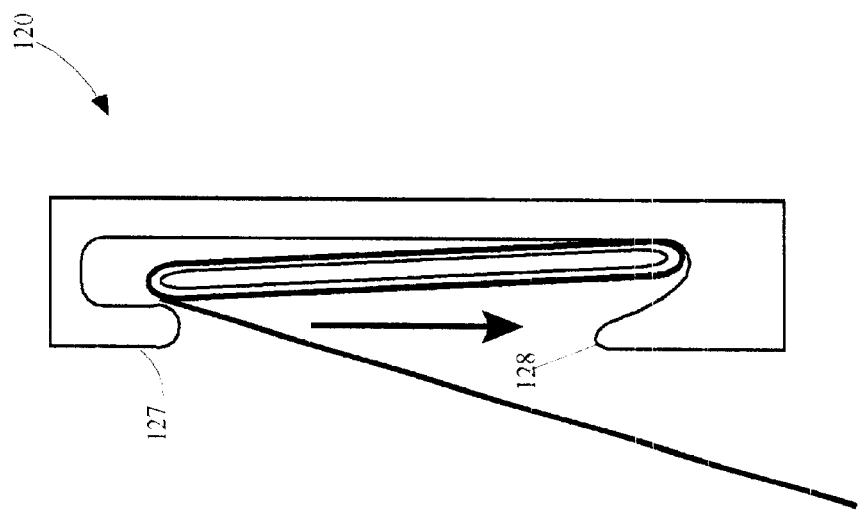
FIGS. 13–19 sequentially illustrate a preferred method for mounting the display assembly 52.
Figure 14:
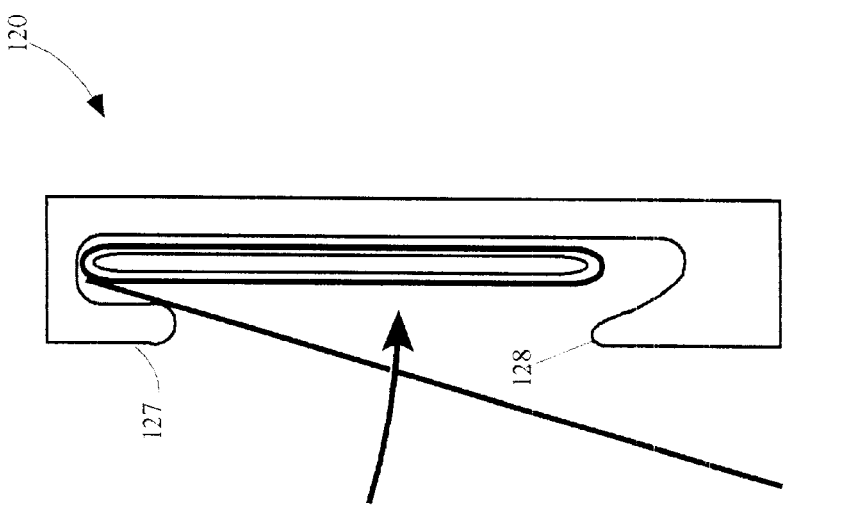
Figure 13:
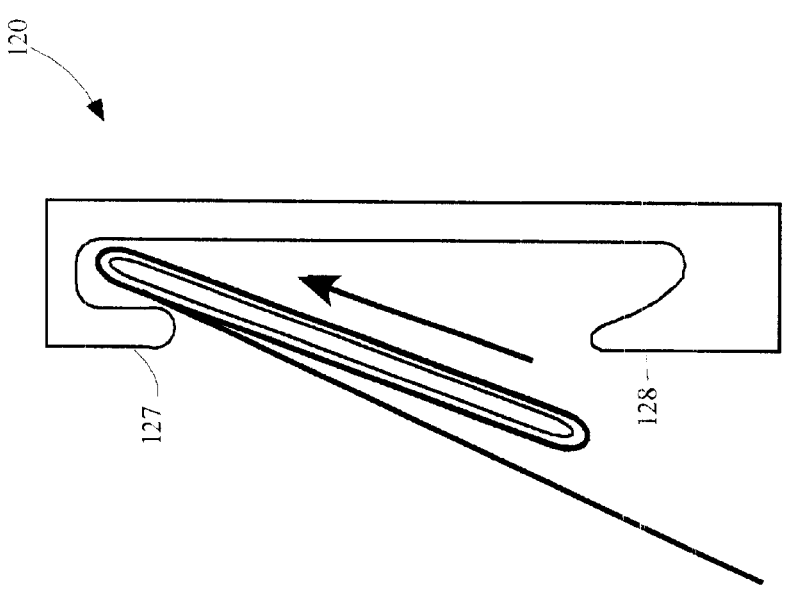
Figure 19:
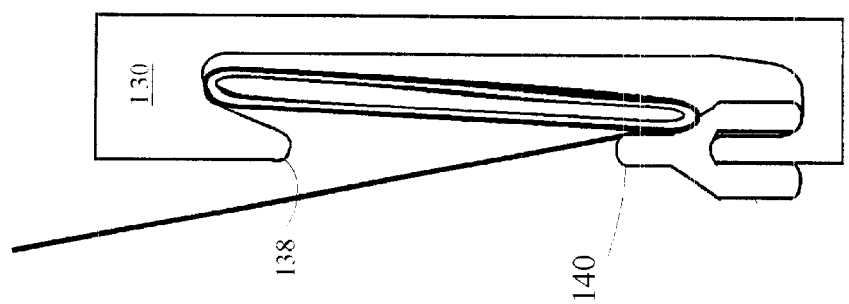

As shown in FIG. 13, a plurality of upper attachment fittings 120 are equidistantly spaced and are permanently fastened in one parallel row along the top of the display surface by means of conventional metal screws or rivets. The upper edge of top stay 12 is inserted into the crooks of the upper lips 127 of the of upper attachment fittings 120. Stay 12 is then pressed flat against the backs of the upper attachment fittings 120, the result being shown in FIG. 14. The stay 12 is then eased downward until the lower edge becomes seated in the crooks of the lower lips 128 of the of upper attachment fittings 120. As shown in FIG. 15, gravity and tension combine to keep the stay 12 secured within the upper attachment fittings 120.

Figure 18:
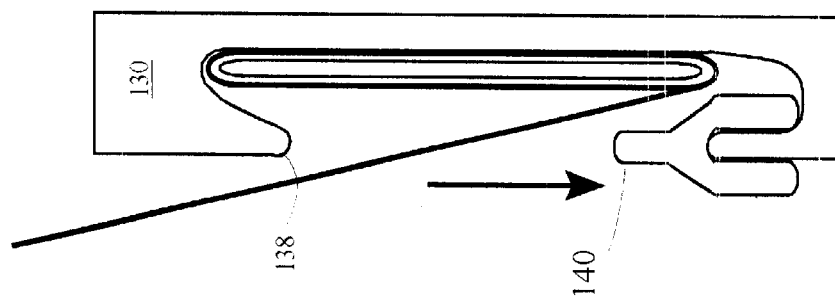
Figure 17:
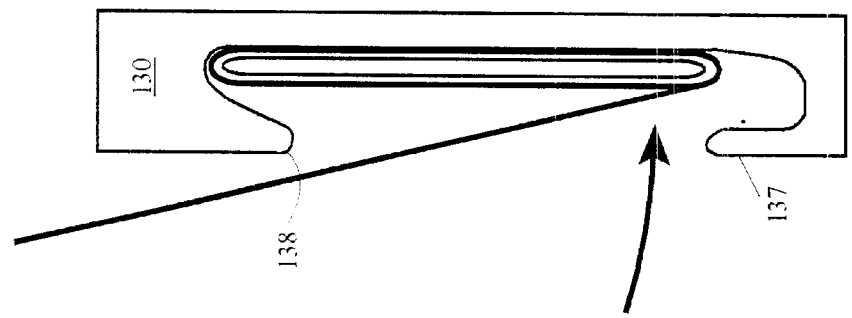
Figure 16:
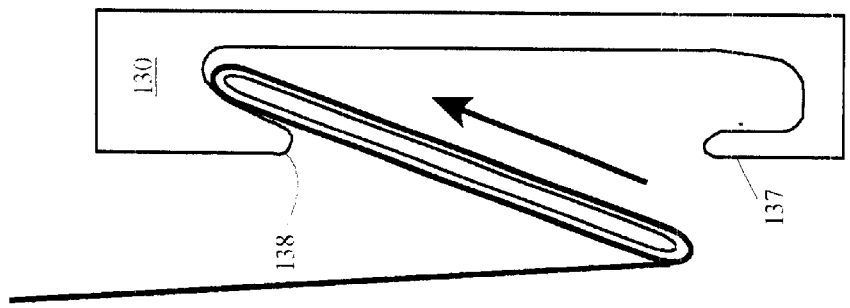

Similarly, and as shown in FIG. 16, a plurality of lower attachment fittings 130 are equidistantly spaced and are permanently fastened in one parallel row along the bottom of the display surface by means of conventional metal screws or rivets. The upper edge of bottom stay 14 is inserted into the crooks of the upper lips 138 of the of lower attachment fittings 130. Stay 14 is then pressed flat against the backs of the lower attachment fittings 130 (the result being shown in FIG. 17). As shown in FIG. 18, the stay 14 is then held in place while an outside retainer 140 is clipped onto the lower lip 137 of each lower attachment fitting 130. The outside retainers 140 are inserted simply by sliding the prongs downward onto lip 137 for a friction fit. Once the outside retainers 140 are inserted, they serve to keep the stay 14 secured within the lower attachment fittings 130.

Figure 20:
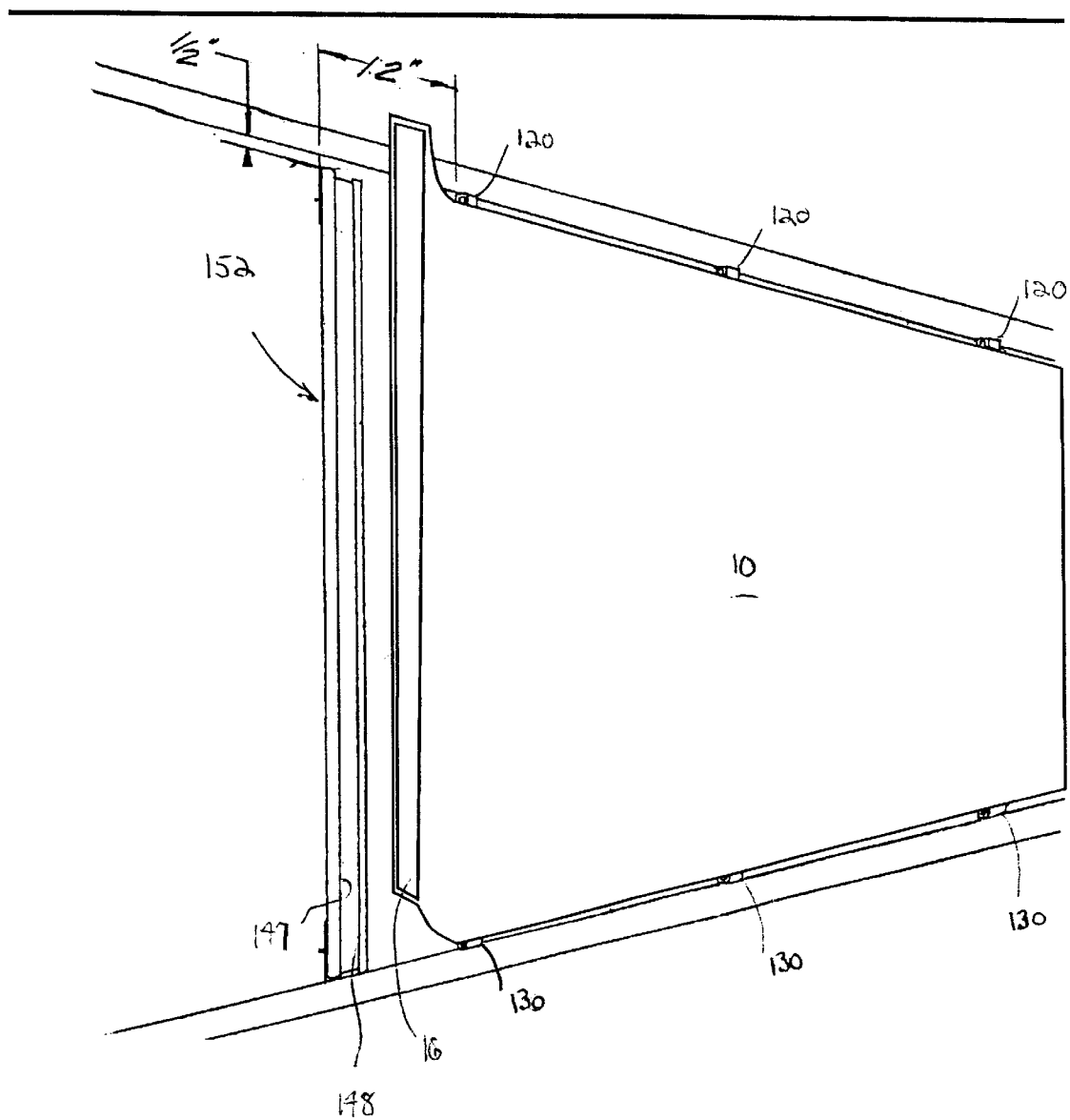
FIG. 20 is a perspective view showing the display panel 10 securely fastened in the upper and lower attachment fittings 120, 130, and about to be anchored by the forward stay 16 to the forward attachment fitting 152.

After the top stay 12 is securely fastened in the upper attachment fittings 120, and the bottom stay 14 is anchored in the lower attachment fittings 130, it remains to secure the forward and rear stays 16, 18 in the respective forward and rear attachment fittings 152, 150. Again, the forward and rear attachment fittings 152, 150 are constructed with the very same cross-section as the lower attachment fittings 130 of FIGS. 9 and 10. FIG. 20 is a perspective view showing the display panel 10 securely fastened in the upper and lower attachment fittings 120, 130, and about to be anchored by the forward stay 16 to the forward attachment fitting 152. The illustrated forward attachment fitting 152 is elongated to extend the entire height of the display panel 10. As with the lower attachment fitting 130, the forward edge of the forward stay 14 is inserted into the crook of the rear lip 148 of the of forward attachment fitting 152. Stay 16 is then pressed flat against the backs of the forward attachment fitting 152. The stay 16 is then held in place while an outside retainer 140 is clipped onto the forward lip 147 of the forward attachment fitting 152. Once the outside retainers 140 are inserted, they serve to keep the stay 16 secured within the forward attachment fitting 152.

The same process is repeated at the rear of the display panel 10 with rear stay 18 and rear attachment fitting 150.

If desired, for protection against unwanted removal, all outside retainers 140 can be secured to the lower attachment fittings 130 and/or front and rear attachment fittings 152, 150 by screws, rivets or the like.

The net result is a uniform horizontal tension imparted across the display panel 10, coupled with a uniform vertical tension. Because the stays 12, 14, 16 and 18 span each respective edge of the display panel, the resulting horizontal and vertical tension is uniform across the entire surface. The invention solves the problem of wrinkles caused by localized stress on the eyelets of prior art display panels, and the advertisement itself is more uniform and visually appealing. The amount of tension imparted to display panel 10 must be carefully maintained. On one hand, the tension must not be excessive or the material will tear. On the other hand, the tension must be sufficient to avoid rippling caused by air flow across a flaccid display panel surface. The present invention allows for convenient adjustment of the tension to loosen or tighten the display panel 10. The width of each stay 12, 14, 16 and 18, the placement of the attachment fittings 120, 130, the dimensions and elasticity of the display panel material (and consequent angle of rotation where tensioning begins) are all variables affecting the final tension. Hence, any of these variables may be changed in order to adjust the surface tension of the display panel.

This new approach to securing the panel to the surface using one-piece attachment fittings (rather than the prior inner and outer retainers) that are permanently mounted on the surface eliminates the need to remove and install retainers every time a new advertisement is displayed.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. An advertising display for mounting an advertisement on a supporting structure, comprising:

an elastic display panel having at least four edges, and a first stay, second stay, third stay and fourth stay each for supporting one of the edges of said display panel, each stay further comprising a flat elongate support member to which one of said edges of said display panel is attached lengthwise;

a plurality of upper attachment fittings spaced lengthwise along an upper area of said supporting structure, each of said upper attachment fittings comprising an inwardly-disposed upper lip to provide a pivotal seating for the upper edge of the first stay, and an inwardly-disposed lower lip to provide a catch for the lower edge of said first stay;

a plurality of lower attachment fittings spaced lengthwise along a lower area of said supporting structure, each of said lower attachment fittings comprising an inwardly-disposed upper lip to provide a pivotal seating for the upper edge of the second stay, and an inwardly-disposed lower lip;

at least one forward attachment fitting extending vertically across said supporting structure, said forward attachment fitting comprising an inwardly-disposed lip to provide a pivotal seating for the forward edge of the third stay, and an outwardly-disposed lip;

at least one rear attachment fitting extending vertically across said supporting structure, said rear attachment fitting comprising an inwardly-disposed lip to provide a pivotal seating for the rear edge of the fourth stay, and an outwardly-disposed lip;

a plurality of retaining clips each for attachment to the outer lips of the corresponding lower, forward and rear attachment fittings to retain the respective second, third and fourth stays captive therein;

whereby said display panel can be tautly suspended over a surface of said supporting structure between said upper, lower, forward and rear attachment fittings.

2. The advertising display according to claim 1, wherein said supporting structure is a billboard.

3. The advertising display according to claim 1, wherein said supporting structure is a side of truck.

4. The advertising display according to claim 3, wherein said truck is a tractor trailer.

5. The advertising display according to claim 1, wherein each stay further comprises a flat elongate support member having a first edge and a second edge, each edge of said display panel being attached lengthwise along one of said stays contiguously with the first edge, said display panel being sized to be stretched between opposing upper and lower attachment fittings.

6. An advertising display for mounting an advertisement on a supporting structure, comprising:

a flexible display panel reinforced about the edges by a plurality of stays, each stay further comprising a flat elongate support member;

a plurality of upper attachment fittings spaced lengthwise along an upper area of said supporting structure, each of said upper attachment fittings comprising an inwardly-disposed upper lip to provide a pivotal seating for an edge of one of said stays, and an inwardly-disposed lower lip to provide a catch for the other edge of said stay;

a plurality of lower attachment fittings spaced lengthwise along a lower area of said supporting structure, each of said lower attachment fittings comprising an inwardly-disposed upper lip to provide a pivotal seating for an edge of another of said stays, and an inwardly-disposed lower lip;

at least one forward attachment fitting extending between said upper and lower attachment fittings, said forward attachment fitting comprising an inwardly-disposed lip to provide a pivotal seating for an edge of another of said stay, and an outwardly-disposed lip;

at least one rear attachment fitting extending between said upper and lower attachment fittings, said forward attachment fitting comprising an inwardly-disposed lip to provide a pivotal seating for an edge of another of said stay, and an outwardly-disposed lip;

a plurality of retaining clips adapted for attachment to the lower lip of the corresponding lower attachment fittings to retain the respective stay seated therein captive.

7. The advertising display for mounting an advertisement according to claim 6, wherein said plurality of retaining clips are also attachable to the outwardly-disposed lip of the corresponding forward and rear attachment fittings to retain the respective stays seated therein captive.

8. A bracket assembly for convenient insertion and anchoring of a fabric stay, comprising:

a unitary elongate member having a flat side for mounting on a supporting structure and an opposing channeled side defining an inwardly-disposed upper lip to provide a pivotal seating for the upper edge of said stay, and an inwardly-disposed lower lip to provide a catch for the lower edge of said stay; and a retaining clip adapted for attachment to the lower lip of the elongate member to maintain the stay captive therein.

* * * * *